US010069740B2

(12) United States Patent
Panchal

(10) Patent No.: US 10,069,740 B2
(45) Date of Patent: Sep. 4, 2018

(54) SYSTEM AND METHOD FOR LOW-OVERHEAD INTEROPERABILITY BETWEEN 4G AND 5G NETWORKS

(71) Applicant: Verizon Patent and Licensing Inc., Arlington, VA (US)

(72) Inventor: Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 18 days.

(21) Appl. No.: 15/390,286

(22) Filed: Dec. 23, 2016

(65) Prior Publication Data

US 2018/0183717 A1    Jun. 28, 2018

(51) Int. Cl.
| | |
|---|---|
| *H04L 12/859* | (2013.01) |
| *H04W 76/02* | (2009.01) |
| *H04W 76/12* | (2018.01) |
| *H04W 76/15* | (2018.01) |
| *H04W 92/02* | (2009.01) |
| *H04W 84/04* | (2009.01) |

(52) U.S. Cl.
CPC ....... *H04L 47/2475* (2013.01); *H04W 76/022* (2013.01); *H04W 76/025* (2013.01); *H04W 76/12* (2018.02); *H04W 76/15* (2018.02); *H04W 84/042* (2013.01); *H04W 92/02* (2013.01)

(58) Field of Classification Search
None
See application file for complete search history.

(56) References Cited

U.S. PATENT DOCUMENTS

| | | | | |
|---|---|---|---|---|
| 2010/0067604 A1* | 3/2010 | Bhadra | .................. | H04B 7/024 375/267 |
| 2014/0321282 A1* | 10/2014 | Pragada | ............ | H04W 36/0072 370/235 |
| 2016/0095108 A1* | 3/2016 | Ryoo | .................... | H04L 5/0007 370/329 |
| 2017/0013473 A1* | 1/2017 | Puthenpura | ............. | H04W 8/26 |
| 2017/0353883 A1* | 12/2017 | Tenny | ............... | H04W 28/0221 |

* cited by examiner

*Primary Examiner* — Anh Ngoc M Nguyen

(57) ABSTRACT

Techniques described herein may allow for the seamless and efficient use of multiple radio access technologies ("RATs"), such as 4G and 5G RATs. A virtualized base station may be used, which processes traffic sent to and/or received from a user equipment ("UE") via 4G and 5G RATs. The virtualized base station may include separate protocol stacks for the separate RATs. One RAT may be the "master" RAT, and the protocol stack for the master RAT may communicate with a core network via a General Packet Radio ("GPRS") Tunneling Protocol ("GTP") tunnel. In the downlink direction, the virtual base station may determine via which RAT traffic, received from the core network, should be sent to the UE by identifying quality of service class indicators ("QCIs") associated with the downlink traffic.

20 Claims, 12 Drawing Sheets

SYSTEM AND METHOD FOR LOW-OVERHEAD INTEROPERABILITY BETWEEN 4G AND 5G NETWORKS

BACKGROUND

Wireless telecommunications systems have been experiencing rapid growth in mobile data demand. In order to accommodate the rapidly growing demand for mobile data, wireless telecommunications providers may utilize wider and/or higher frequency bands than are traditionally used for Third Generation Partnership Project ("3GPP") third generation ("3G") or fourth generation ("4G") radio access technologies ("RATs"). The wider and/or higher frequency next generation RATs may be capable of significantly higher throughput than 3G or 4G RATs. However, since current systems are not necessarily built to handle the increased throughout provided by next generation RATs, wireless telecommunications providers may face challenges and/or increased costs in moving data between base stations and their core networks.

DETAILED DESCRIPTION OF PREFERRED EMBODIMENTS

The following detailed description refers to the accompanying drawings. The same reference numbers in different drawings may identify the same or similar elements.

Figure 1:
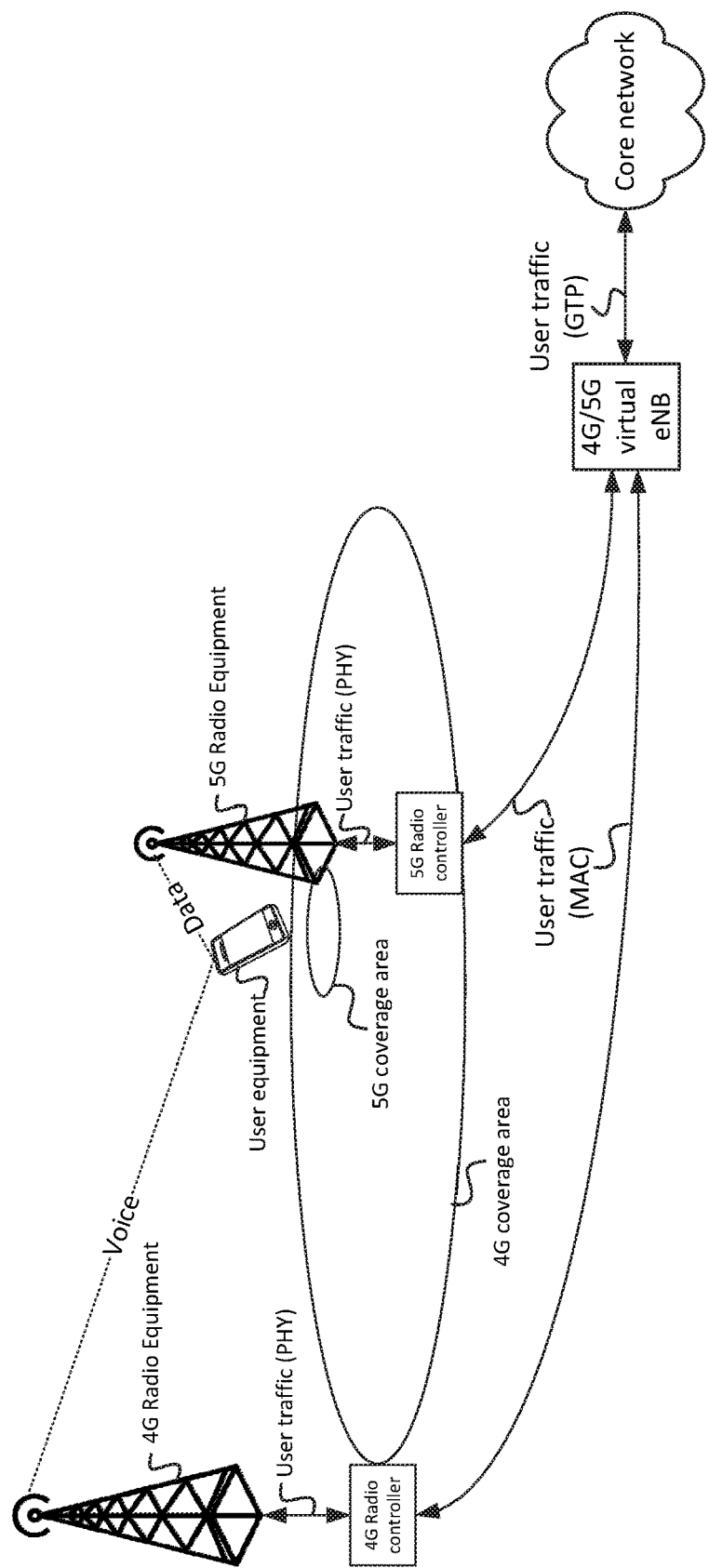
FIG. 1 illustrates an example overview of one or more implementations described herein.

Systems and/or methods, described herein, may allow for the seamless and efficient use of multiple different radio access technologies ("RATs"), such as Third Generation Partnership Project ("3GPP") fourth generation ("4G") and fifth generation ("5G") RATs. For example, as shown in FIG. 1, a user equipment ("UE") may be within the coverage area of both 4G radio equipment (e.g., radio transceivers) and 5G radio equipment. The UE may be capable of simultaneously communicating with both base stations. For instance, the UE may send and/or receive data (e.g., file downloads, web browsing, or the like) and/or voice communications to and/or from the 5G radio equipment, and may send and/or receive data and/or voice communications to and/or from the 4G radio equipment. In the specific example shown in FIG. 1, the UE may send and/or receive voice communications to and/or from the 4G radio equipment, and may send and/or receive data to and/or from the 5G radio equipment.

Conventionally, when a radio access network ("RAN") communicates with a wireless telecommunications core network (e.g., when a Long-Term Evolution ("LTE") evolved Node B ("eNB") communicates with a Serving Gateway ("SGW")), a specialized S1 interface is used to transport data between physical eNBs and one or more physical SGWs. However, since conventional systems require physical devices with specialized interfaces, such systems encounter difficulties in scalability.

For example, typically, a RAN may include Radio Equipment ("RE") and Radio Controllers ("RCs" (the combination of RE and one or more RCs may be referred to herein as an "RE/RC")) that process physical ("PHY") layer (e.g., Open Systems Interconnection ("OSI") Layer 1) user data (e.g., voice traffic, data traffic, etc.) that is sent to and/or received from a UE (e.g., wireless telephones or other devices) via an air interface. An RE may communicate PHY layer data (e.g., as In-phase/Quadrature ("IQ") modulation data) with an RC using a fiber link, such as a Common Radio Public Interface ("CPRI") link. The RC may generate higher layer (e.g., Media Access Control ("MAC") layer (e.g., OSI Layer 2)) packets based on the PHY layer data. The RC may communicate with an eNB, may generate even higher layer packets (e.g., Packet Data Convergence Protocol ("PDCP") layer (e.g., OSI Layer 3) packets) based on the MAC layer packets, and communicate with an Evolved Packet Core ("EPC") (e.g., may send and/or receive user traffic to and/or from a Serving Gateway ("SGW") of the EPC).

In order to handle additional data (such as when implementing a 5G RAT, which can provide a significantly greater throughput than 4G RATs), a solution within the existing system could include adding additional physical fiber links between (1) Radio Equipment (RE) and Radio Controllers (RCs), (2) between RCs and eNBs, and/or between (3) eNBs and SGWs. However, these solutions present the potential for extreme costs and/or other difficulties. Additionally, because 5G RATs have the potential for carrying such vast amounts of data (hundreds of times the amount of data that 4G RATs are designed to handle), the use of specialized 5G hardware could prove costly.

As described herein, a virtualized system provides beneficial scalability and flexibility to wireless telecommunications systems, such that the throughput able to be handled by such systems may be significantly increased. Using the virtualized environment described herein, wireless telecommunications providers are able to offer 5G RATs to subscribers, and may further implement 5G RATs alongside existing 4G RATs. In some implementations, the virtualized system described herein may transport data, at layers higher than the PHY layer, from RE/RCs to a virtualized eNB ("V-eNB"), or a virtual base station, which may include a set of devices, such as a "cloud" system that implements the functionality of one or more eNBs. For instance, the RE/RCs may transport MAC layer data to and/or from the virtual eNB. By transporting MAC data instead of PHY data, the amount of overhead may be reduced (e.g., PHY layer header information), thereby reducing the need for specialized physical links to transport data between the RE/RCs and the V-eNB 215. For example, since V-eNB 215s can be implemented using any suitable hardware, the links between RE/RCs and V-eNB 215s can be suitable transmission link, as opposed to a specialized fiber link. As mentioned above, the reduced need for physical links may be beneficial in systems where very large amounts of data need to be transported, such as in systems that implement 5G RATs.

FIG. 1 illustrates an example overview of an example implementation described herein. As shown in FIG. 1, a UE may be located within the coverage areas of a 4G RAN and a 5G RAN. For example, as illustrated in FIG. 1, the UE may be able to communicate with the 4G RE and the 5G RE. In this example, different types of data may be communicated via different RANs. For instance, as shown, the 4G RAN may be used for voice traffic, and the 5G RAN may be used for data traffic (e.g., web browsing, text messaging, etc.).

The RE of each RAN may communicate with a respective RC. For example, PHY layer data may be communicated between respective REs and RCs. As mentioned above, the RCs may process data at the MAC layer (e.g., may receive MAC layer data and provide the data as PHY layer data to a respective RE, and/or may receive PHY layer data from a respective RE and process the data up to MAC layer data). The RC may communicate with a V-eNB 215, which, as described herein, may implement eNB functionality with respect to multiple RATs (e.g., 4G and 5G RATs, in this example).

The V-eNB 215 may process General Packet Radio ("GPRS") Tunneling Protocol ("GTP") data, and may communicate with a core network (e.g., an EPC of a wireless telecommunication network) using GTP signaling. For example, the V-eNB 215 may receive MAC layer data from 4G and/or 5G RCs, and process the data up to GTP layer data (e.g., may encapsulate the MAC layer data in GTP packets), and/or may receive GTP layer data from the EPC and provide the data to respective 4G and/or 5G RCs as MAC layer data.

Figure 2:
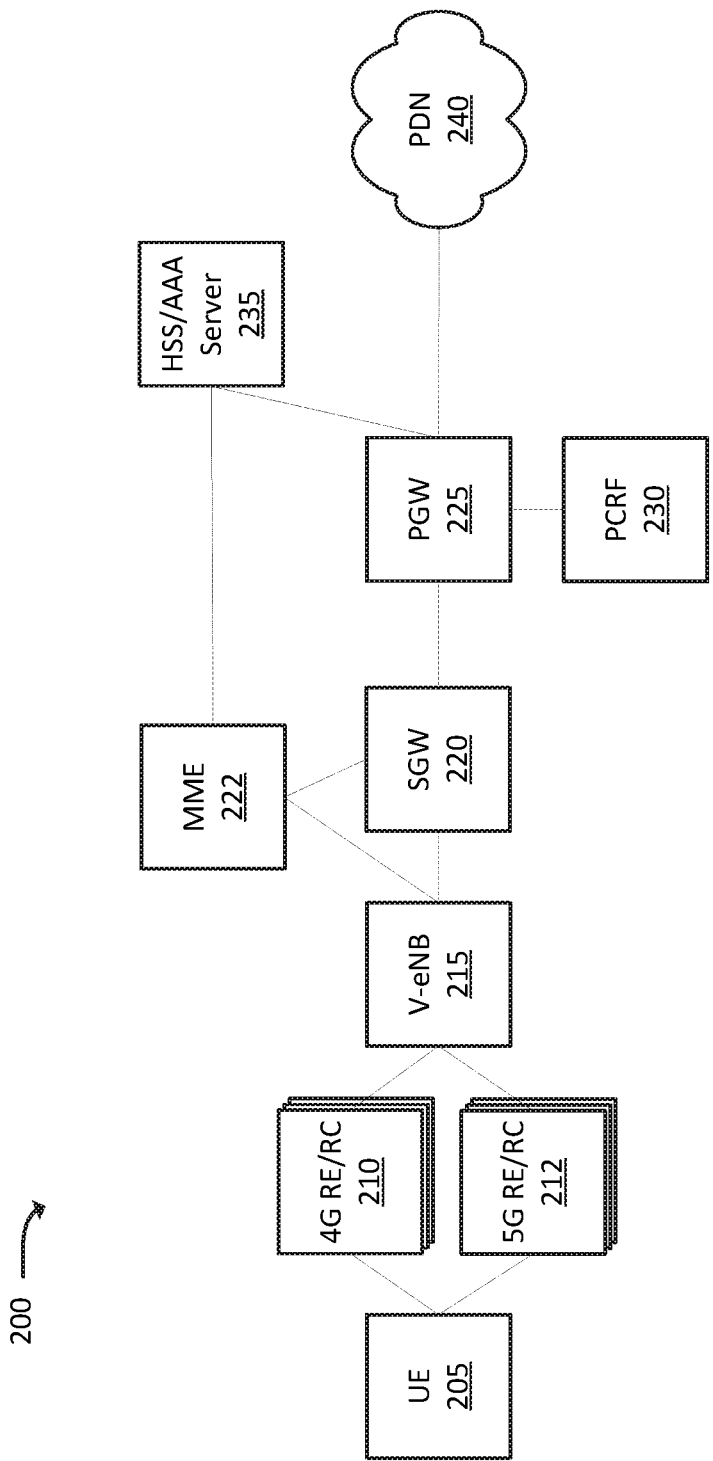
FIGS. 2-4 illustrate example environments, in which systems and/or methods, described herein, may be implemented.
Figure 3:
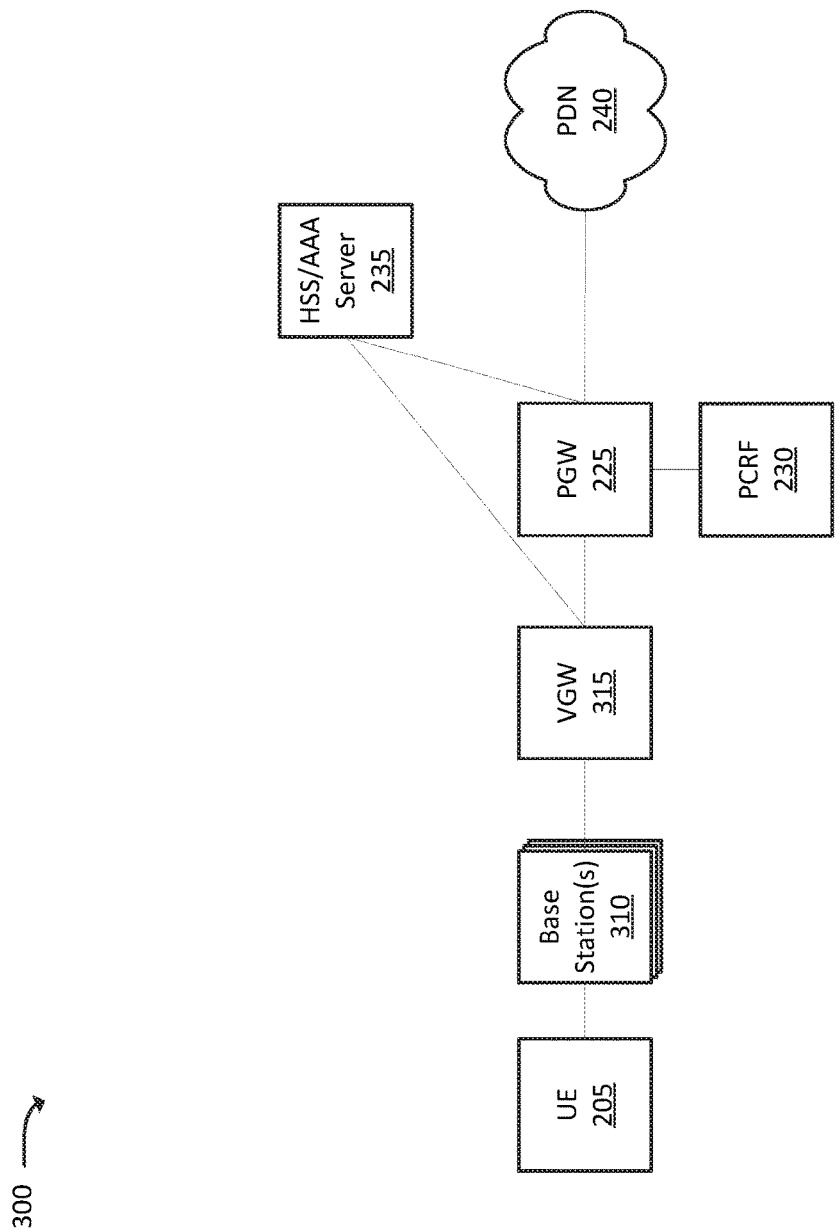
Figure 4:
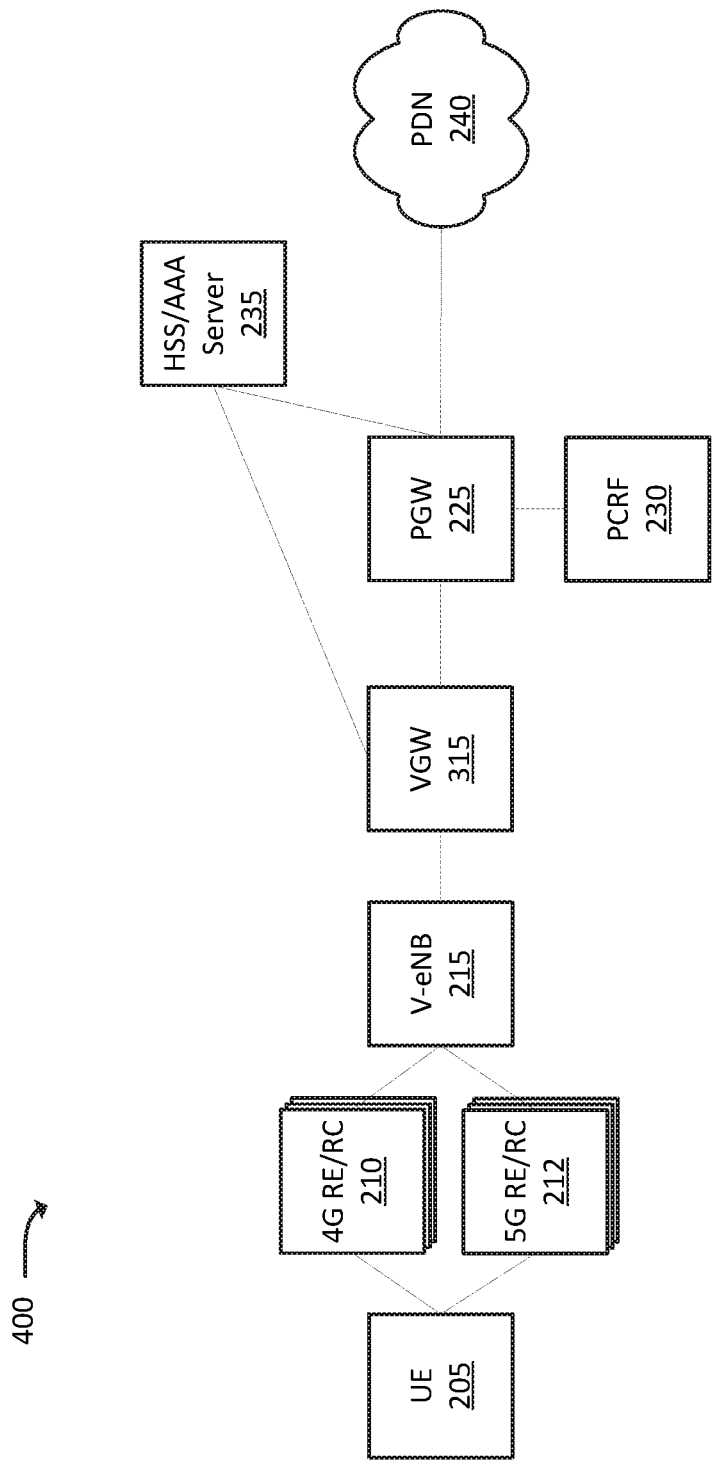

FIG. 2 illustrates example environment 200, in which systems and/or methods described herein may be implemented. As shown in FIG. 2, environment 200 may include UE 205, 4G RE/RC 210, 5G RE/RC 212, V-eNB 215, SGW 220, mobility management entity device ("MME") 222, packet data network ("PDN") gateway ("PGW") 225, policy and charging rules function ("PCRF") 230, home subscriber server ("HSS")/authentication, authorization, accounting ("AAA") server 235 (hereinafter referred to as "HSS/AAA server 235"), and PDN 240. While "direct" connections are shown in FIGS. 2-4 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIGS. 2-4 may be logical connections, and may represent the communication between different logical portions of a single device.

Environment 200 may include an evolved packet system ("EPS") that includes an LTE network and/or an EPC network that operate based on a 3GPP wireless communication standard. The LTE network may be, or may include, one or more RANs that each include one or more RE and/or RCs (e.g., RE/RC 210 and/or RE/RC 212), and/or base stations (e.g., V-eNB 215), via which UE 205 may communicate with the EPC network. In some implementations, while not explicitly shown, environment 200 may also include one or more conventional eNBs. In this example, the EPC network may include one or more SGWs 215, PGWs 225, and/or MMEs 222, and may enable UE 205 to communicate with PDN 240 and/or an Internet protocol ("IP") multimedia subsystem ("IMS") core network (not shown). The IMS core network may include and/or communicate with HSS/AAA server 235, and may manage authentication, session initiation, account information, a user profile, etc., associated with UE 205.

UE 205 may include a computation and communication device, such as a wireless mobile communication device that is capable of communicating with 4G RE/RC 210, 5G RE/RC 212, and/or PDN 240. For example, UE 205 may include a "dual-band," a "tri-band," a "quad-band," etc. device that is capable of simultaneously communicating via multiple RATs (e.g., via a 4G RAT, a 5G RAT, etc.). UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; or another type of mobile computation and communication device. UE 205 may send traffic to and/or receive traffic from PDN 240 via 4G RE/RC 210, 5G RE/RC 212, V-eNB 215, SGW 220, and/or PGW 225.

4G RE/RC 210 may include one or more network devices that receive, process, and/or transmit traffic, such as calls, audio, video, text, and/or other data, destined for and/or received from UE 205. In one example, 4G RE/RC 210 may be part of the LTE network, and may correspond to a 4G RAT (e.g., may communicate with UE 205 using one or more radio frequency bands associated with the 4G RAT). 4G RE/RC 210 may receive traffic, destined for UE 205, from V-eNB 215, SGW 220, PGW 225, and/or PDN 240, and may output the traffic to UE 205. 4G RE/RC 210 may also receive traffic from UE 205, and may output the traffic to its intended destination via V-eNB 215, SGW 220, PGW 225, and/or PDN 240. 4G RE/RC 210 may include one or more REs, such as one or more radio transceivers, and one or more RCs, which aggregate and/or de-aggregate data that is received via and/or is to be sent via the REs. The RE and RC components of 4G RE/RC 210 may be communicatively coupled via a CPRI link and/or via some other type of physical link. As mentioned above, the RE component of 4G RE/RC 210 may communicate PHY layer data with the RC component, while the RC component communicates MAC layer data with V-eNB 215.

5G RE/RC 212 may include one or more network devices that receive, process, and/or transmit traffic, such as calls, audio, video, text, and/or other data, destined for and/or received from UE 205. In one example, 5G RE/RC 212 may be part of the LTE network, and may correspond to a 5G RAT (e.g., may communicate with UE 205 using one or more radio frequency bands associated with the 5G RAT). 5G RE/RC 212 may receive traffic, destined for UE 205, from V-eNB 215, SGW 220, PGW 225, and/or PDN 240, and may output the traffic to UE 205. 5G RE/RC 212 may also receive traffic from UE 205, and may output the traffic to its intended destination via V-eNB 215, SGW 220, PGW 225, and/or PDN 240. 5G RE/RC 212 may include one or more REs, such as one or more radio transceivers, and one or more RCs, which aggregate and/or de-aggregate data that is received via and/or is to be sent via the REs. The RE and RC components of 5G RE/RC 212 may be communicatively coupled via a CPRI link and/or via some other type of physical link. As mentioned above, the RE component of 5G RE/RC 212 may communicate PHY layer data with the RC component, while the RC component communicates MAC layer data with V-eNB 215.

As described in more detail herein (e.g., with respect to FIGS. 5-7), V-eNB 215 may include one or more devices that aggregate data from one or more RE/RCs (e.g., 4G RE/RC 210 and/or 5G RE/RC 212), process data received from the RE/RCs (e.g., process MAC layer data into higher layer data, such as PDCP layer data), and communicate with SGW 220 using GTP communications. Additionally, V-eNB 215 may receive user data from SGW 220 via GTP communications, may process the user data into MAC layer data, and provide the MAC layer data to the appropriate RE/RC (e.g., to 4G RE/RC 210 and/or 5G RE/RC 212).

V-eNB 215 may be implemented in a "cloud"-based environment. That is, V-eNB 215 may include the hardware resources of one or more distributed devices. In some implementations, the amount of resources provisioned for V-eNB 215 may be dynamically adjusted based on the demand for such resources. In this manner, the virtualized nature of V-eNB 215 may allow for flexibility and scalability of the traffic handling capabilities of the RAN(s) implemented by 4G RE/RC 210, 5G RE/RC 212, and/or V-eNB 215.

SGW 220 may include one or more network devices that gather, process, search, store, and/or provide information in a manner described herein. SGW 220 may, for example, aggregate traffic received from one or more base stations 210, and may send the aggregated traffic to PDN 240 via PGW 225.

PGW 225 may include one or more network devices that gather, process, search, store, and/or provide information in a manner described herein. PGW 225 may aggregate traffic received from one or more SGWs 215, etc. and may send the aggregated traffic to PDN 240. PGW 225 may also, or alternatively, receive traffic from PDN 240 and may send the traffic toward UE 205 via base station 210 and/or SGW 220.

MME 222 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 222 may perform policing operations on traffic destined for and/or received from UE 205.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with UE 205); information regarding services to which particular subscribers are subscribed (e.g., communication services, such as video conferencing services, voice chat services, etc.); and/or other information. Additionally, or alternatively, HSS/AAA server 235 may perform authentication, authorization, and/or accounting operations associated with the subscriber and/or a communication session with UE 205.

PDN 240 may include one or more wired and/or wireless networks. For example, PDN 240 may include an IP-based PDN, a wide area network ("WAN") such as the Internet, a core network of a telecommunications provider, a private enterprise network, and/or one or more other networks. UE 205 may connect, through PGW 225, to data servers, application servers, other UEs 205, and/or to other servers or applications that are coupled to PDN 240. PDN 240 may be connected to one or more other networks, such as a public switched telephone network ("PSTN"), a public land mobile network ("PLMN"), and/or another network. PDN 240 may be connected to one or more devices, such as content providers, applications, web servers, and/or other devices, with which UE 205 may communicate.

FIG. 3 illustrates another example environment 300, in which systems and/or methods described herein may be implemented. As shown in FIG. 3, environment 300 may include UE 205, one or more base stations 310, virtualized gateway ("VGW") 315, PGW 225, PCRF 230, HSS/AAA server 235, and PDN 240. Some of the devices, shown in FIG. 3, are similar to devices described above with respect to FIG. 2, and will not be described in detail below.

Environment 300 may include an evolved packet system ("EPS") that includes an LTE network and/or an EPC network that operate based on a 3GPP wireless communication standard and/or another advanced wireless standard. The LTE network may be, or may include, one or more RANs that each include one or more base stations 310, via which UE 205 may communicate with the EPC network. Base stations 310 may include, or may be, a conventional (or standard) LTE eNB. In this example, the EPC network may include VGW 315 and PGW 225, and may enable UE 205 to communicate with PDN 240 and/or an IMS core network (not shown).

Base station 310 may include one or more network devices that receive, process, and/or transmit traffic, such as calls, audio, video, text, television programming content, and/or other data, destined for and/or received from UE 205. Base station 310 may be an eNB device and may be part of the LTE network. Base station 310 may receive traffic from and/or send traffic to PDN 240 via VGW 315 and PGW 225. Base station 310 may send traffic to and/or receive traffic from UE 205 via an air interface. In some implementations, base station 310, or multiple base stations 310, may include multiple radio transceivers and/or other hardware or logic that is capable of implementing RANs that correspond to multiple different RATs. For example, base station 310 may implement a 4G RAT and a 5G RAT, or one base station 310 may implement a 4G RAT while another base station 310 implements a 5G RAT.

VGW 315 may include one or more devices that perform functions similar to an SGW and/or an MME (e.g., SGW 220 and/or MME 222, as described above). VGW 315 may be implemented in a "cloud"-based environment. That is, VGW 315 may include the hardware resources of one or more distributed devices. In some implementations, the amount of resources provisioned for VGW 315 may be adjusted based on the demand for such resources. In this manner, the virtualized nature of VGW 315 may allow for flexibility and scalability of the traffic handling capabilities of the RAN(s) implemented by base station(s) 310.

FIG. 4 illustrates another example environment 400, in which systems and/or methods described herein may be implemented. As shown in FIG. 4, environment 400 may include UE 205, 4G RE/RC 210, 5G RE/RC 212, V-eNB 215, VGW 315, PGW 225, PCRF 230, HSS/AAA server 235, and PDN 240.

Environment 400 may include a combination of several of the devices described above with respect to FIGS. 3 and 4. For instance, as compared to conventional systems, environment 400 may employ virtualized devices to implement base stations (e.g., eNBs) as well as the entry point to the EPC (e.g., an SGW). Further, environment 400 may make use of 4G RE/RC 210 and 5G RE/RC 212, which may add to the scalability and flexibility of the implementation shown in FIG. 4.

FIGS. 5, 7, and 9-11 illustrate example functional components of one or more RE/RCs and/or V-eNB 215s discussed above, as well as protocol stacks and communication pathways between RE/RCs, V-eNB 215s, UE 205, and/or an EPC. FIGS. 6, 8, and 12 illustrate example signal flows that may occur between functional components of some implementations described with respect to FIGS. 5, 7, and/or 9-11.

Figure 5:
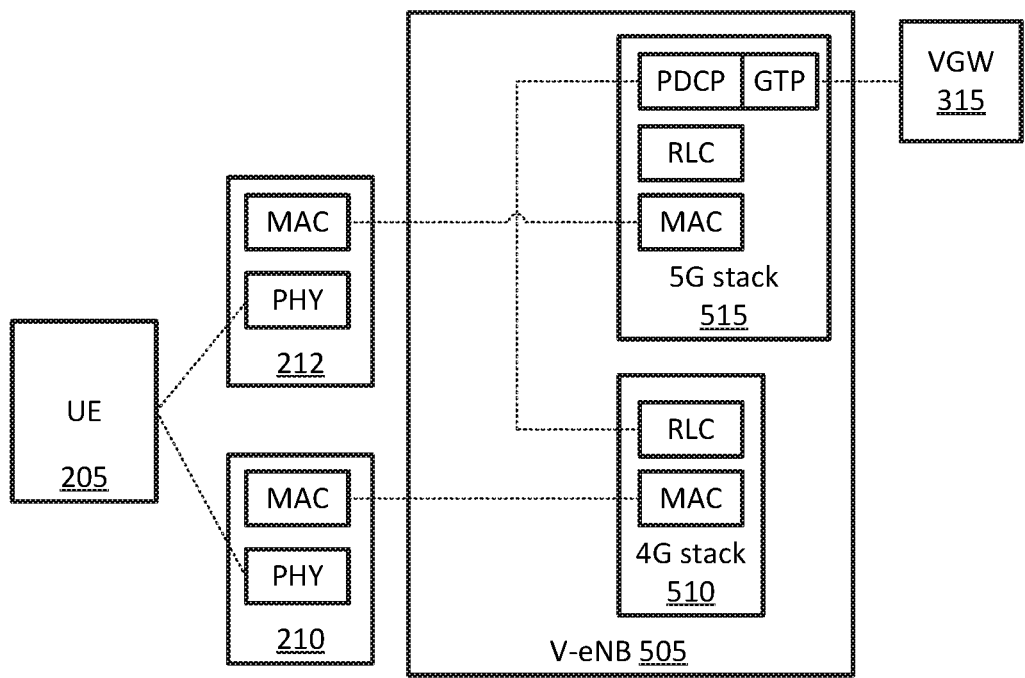
FIG. 5 illustrates example functional components of various devices, including a virtual evolved Node B ("V-eNB"), in accordance with one or more implementations where a 5G RAT is a "master" RAT.
Figure 6:
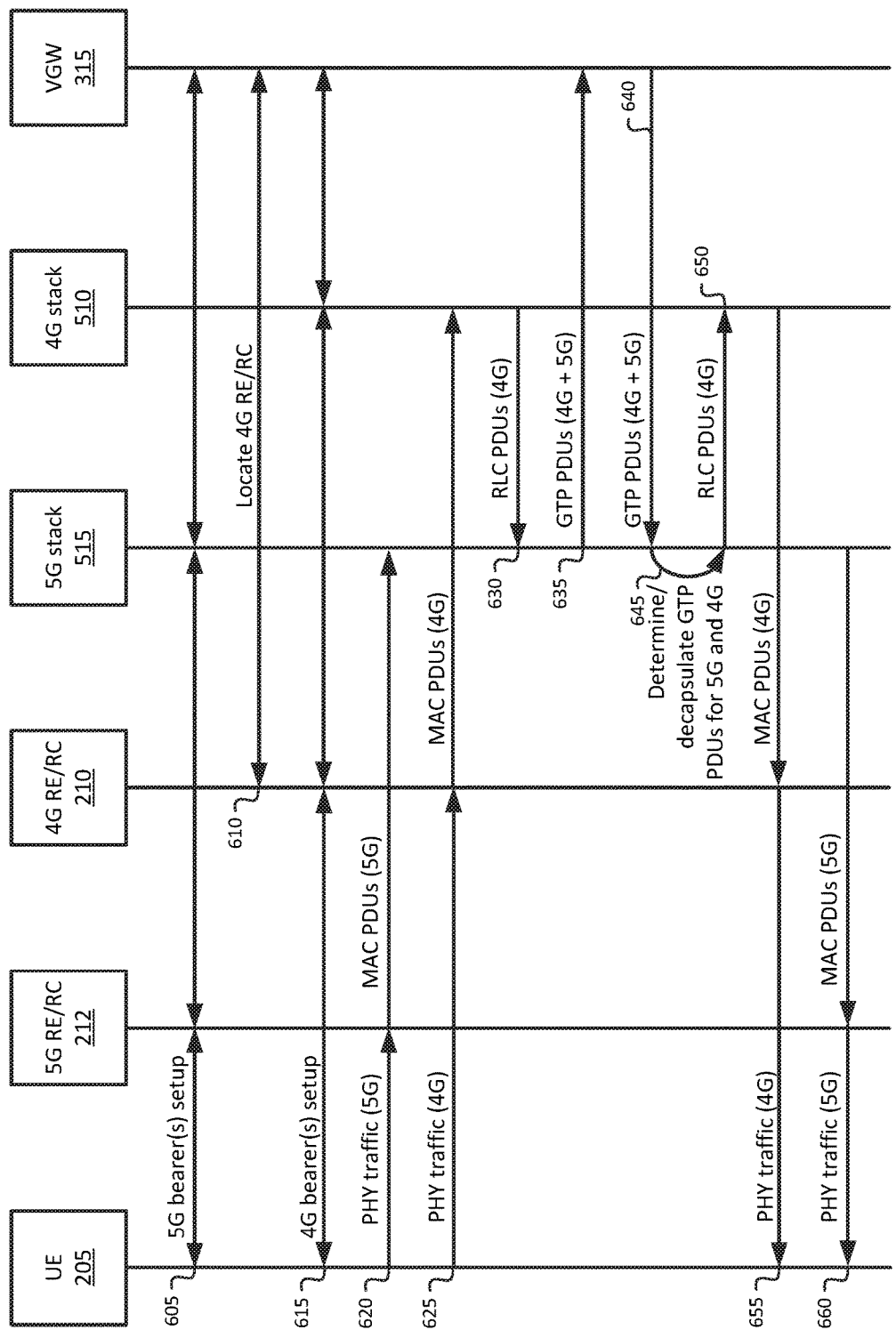
FIG. 6 illustrates example signaling that may occur, in accordance with one or more implementations where a 5G RAT is a "master" RAT.

For example, as shown in FIG. 5, UE 205 may be communicatively coupled to 4G RE/RC 210 and 5G RE/RC 212. This communication may occur via an air interface, according to a corresponding RAT. For instance, UE 205 may communicate with 4G RE/RC 210 via a 4G RAT, and may communicate with 5G RE/RC 212 via a 5G RAT. More specifically, for instance, UE 205 may communicate with 4G RE/RC 210 and 5G RE/RC 212 via the PHY layer (e.g., may send and/or receive traffic according to an Orthogonal Frequency-Division Multiple Access ("OFDMA") modulation scheme to and/or from 4G RE/RC 210 and 5G RE/RC 212). In the downlink direction, 4G RE/RC 210 and 5G RE/RC 212 may receive MAC layer protocol data units ("PDUs") destined for UE 205 (e.g., from V-eNB 215 505), and may process the MAC PDUs to PHY layer traffic (e.g., according to an OFDMA modulation scheme).

In the example shown in FIG. 5, the 5G RAT may be the "master" RAT. For example, as described below, UE 205 may have first established communications with 5G RE/RC 212 (i.e., prior to connecting to, or communicating with, 4G RE/RC 210). 4G RE/RC 210 and 5G RE/RC 212 may each respectively process PHY layer traffic received from UE 205 up to the MAC layer. For example, 4G RE/RC 210 and 5G RE/RC 212 may each construct MAC PDUs based on PHY layer traffic received from UE 205, and may communicate the MAC PDUs to V-eNB 215 505. In some implementations, separate bearers (e.g., Layer 2 bearers, such as guaranteed bitrate ("GBR") or non-GBR bearers) may be established between UE 205 and V-eNB 215 505 (e.g., via 4G RE/RC 210 and 5G RE/RC 212). In some implementations, the different bearers may correspond to different Quality of Service ("QoS") levels. For example, in an LTE implementation, different QoS levels may be mapped to different QoS Class Indicators ("QCIs"). As similarly discussed above, different bearers may be used for different applications (e.g., which can correspond to different QCIs). For instance, a bearer on the 4G RAT may be used for voice calls, while a bearer on the 5G RAT may be used for data traffic.

A first bearer, corresponding to a first QCI (or a first set of bearers, corresponding to a first set of different QCIs), may be established between UE 205 and V-eNB 215 505 (e.g., via 4G RE/RC 210), while a second bearer, corresponding to a second QCI (or a second set of bearers, corresponding to a second set of different QCIs), may be established between UE and 205 (e.g., via 5G RE/RC 212).

The traffic, sent to and/or received via 4G RE/RC 210, may be processed by 4G protocol stack (hereinafter referred to as "4G stack") 510, while the traffic, sent to and/or received via 5G RE/RC 212, may be processed by 5G protocol stack (hereinafter referred to as "5G stack") 515. The MAC PDUs, sent and/or received by 4G RE/RC 210 and/or 5G RE/RC 212, may be marked with QCI markings (e.g., in the header of the MAC PDUs), which indicate the QCI that corresponds to each particular MAC PDU.

V-eNB 215 505 may include 4G stack 510 and 5G stack 515, each of which may be implemented as one or more hardware devices, software logic, or a combination thereof. As shown, 4G RE/RC 210 may communicate with 4G stack 510, while 5G RE/RC 212 may communicate with 5G stack 515. In some implementations, some or all components of V-eNB 215 505 may be implemented in a virtualized manner. For example, one or more devices (e.g., a "cloud" system) may be used to implement 4G stack 510, and/or 5G stack 515. In some implementations, 4G stack 510 and/or 5G stack 515 may be implemented using one or more virtual machines provisioned on a single device or a collection of devices (e.g., a distributed system). The communication between RE/RCs 210 and 212 and V-eNB 215 505 may occur via any suitable communication link. For example, dedicated fiber lines (e.g., a CPRI link) may be used to carry communications between RE/RCs 210 and 212 and V-eNB 215 505. Additionally, or alternatively, other types of suitable communication pathways, which are not limited to dedicated fiber lines. For example, when not needed for carrying communications between RE/RCs 210 and 212 and V-eNB 215 505, such communication pathways may be used or provisioned for other purposes. In some implementations, V-eNB 215 505 may be implemented on the same device, or set of devices, as 4G RE/RC 210 and/or 5G RE/RC 212. In some such implementations, the communication pathways between RE/RCs 210 and 212 and V-eNB 215 505 may include an intra-device bus.

Generally speaking, 4G stack 510 may process traffic sent to and/or received from UE 205 via the 4G RAT, while 5G stack 515 may process traffic sent to and/or received from UE 205 via the 5G RAT. Furthermore, as mentioned above and as described in more detail below, 5G stack 515 may perform additional functions, due to being associated with the "master" RAT in this scenario. 4G stack 510 may, for example, process MAC PDUs, received from 4G RE/RC 210, up to Radio Link Control ("RLC") PDUs (e.g., may construct RLC PDUs from multiple MAC PDUs). 5G stack 515 may process MAC PDUs, received from UE 205, up to PDCP PDUs (e.g., process MAC PDUs up to RLC PDUs, and then to PDCP PDUs). 5G stack 515 may also process RLC PDUs, from 4G stack 510, (e.g., which correspond to 4G traffic from UE 205), up to PDCP PDUs. For example, 4G stack 510 may output the RLC PDUs to 5G stack 515, which may generate PDCP PDUs based on the RLC PDUs from 4G stack 510.

In some implementations, 5G stack 515 may preserve QoS treatment of traffic received via 4G RE/RC 210 and 5G RE/RC 212 by generating separate PDCP PDUs for traffic received via each of 4G RE/RC 210 and 5G RE/RC 212. For example, one PDCP PDU, generated by 5G stack 515, may be made up of RLC PDUs processed by 5G stack 515, while another PDCP PDU generated by 5G stack 515 may be made up only of RLC PDUs received from 4G stack 510.

In some implementations, however, 5G stack 515 may generate PDCP PDUs that are made up of RLC PDUs that were processed by 5G stack 515 and received from 4G stack 510. In some such implementations, 5G stack 515 may mark and/or treat each PDCP PDUs according to the highest QoS (e.g., QCI) associated with a RLC PDU that is included in each PDCP PDU. 5G stack 515 may generate GTP PDUs based on one or more PDCP PDUs, and communicate the GTP PDUs to VGW 315. In some implementations, instead of communicating the GTP PDUs to VGW 315, 5G stack 515 may communicate the GTP PDUs to an SGW, such as SGW 220 (e.g., through an established GTP tunnel between 5G stack 515 and VGW 315 and/or SGW 220).

FIG. 6 illustrates an example signal flow between the components shown in FIG. 5. As shown, a bearer setup process may occur (at 605) between UE 205, 5G RE/RC 212, V-eNB 215 505 (e.g., 5G stack 515), and VGW 315. For example, UE 205 may enter a communications range of 5G RE/RC 212, power on while in communications range of 5G RE/RC 212, etc. The bearer setup process may occur according to known standards and/or some other suitable process. As a result of the bearer setup process, one or more bearers (each with a corresponding QCI) may be established between UE 205 and, ultimately, VGW 315. As mentioned above, VGW 315 may be the entry point to a core network, which may provide connectivity, for UE 205, to PDN 240 (e.g., the Internet).

VGW 315 may locate (at 610) a suitable 4G RE/RC 210, from a pool of candidate RE/RCs 210, to serve 4G communications to and/or from UE 205. For example, VGW 315 may locate a particular 4G RE/RC 210 that is geographically located nearest to the location of UE 205, nearest to the location of 5G RE/RC 212, and/or may use one or more other factors in locating a suitable 4G RE/RC 210 (e.g., how loaded or overloaded the candidate RE/RCs 210 are, etc.). In some implementations, 4G RE/RC 210 may be located by MME 222 in lieu of, or in addition to, VGW 315. Once 4G RE/RC 210 has been located, one or more bearers may be set up (at 615) between UE 205, 4G RE/RC 210, V-eNB 215 505 (e.g., 4G stack 510), and VGW 315.

Arrows 620-635, in FIG. 6, illustrate how uplink traffic (i.e., traffic from UE 205) may be handled, while arrows 640-660 illustrate how downlink traffic (i.e., traffic to UE 205) may be handled, in accordance with some implementations. As shown, UE 205 may send (at 620) traffic, using the 5G RAT, to 5G RE/RC 212. The traffic may be sent as PHY layer traffic using the 5G RAT (e.g., according to an OFDMA modulation scheme). 5G RE/RC 212 may receive the traffic from UE 205, and may construct MAC PDUs based on the received traffic. 5G RE/RC 212 may provide the MAC PDUs to V-eNB 215 505 (e.g., 5G stack 515). 5G stack 515 may construct PDCP PDUs based on the MAC PDUs.

UE 205 may also send (at 625) traffic, using the 4G RAT, to 4G RE/RC 210. In some implementations, UE 205 may send traffic to 4G RE/RC 210 and 5G RE/RC 212 simultaneously, such as in scenarios where UE 205 uses the 4G RAT for voice calls, and the 5G RAT for data. 4G RE/RC 210 may construct MAC PDUs from the traffic sent to 5G RE/RC 212, and provide the MAC PDUs to V-eNB 215 505 (e.g., 4G stack 510). 4G stack 510 may process the MAC PDUs up to the RLC layer (e.g., may construct RLC PDUs based on the MAC PDUs).

Since the 4G RAT is not the "master" RAT in this implementation, 4G stack 510 may pass the RLC PDUs to 5G stack 515 (e.g., via an intra-device bus when 4G stack 510 and 5G stack 515 are implemented by the same device, or via some other type of inter-device communication pathway when 4G stack 510 and 5G stack 515 are implemented by different devices). 5G stack 515 may construct PDCP PDUs based on the RLC PDUs received from 4G stack 510.

As mentioned above, these PDCP PDUs may be distinct from PDCP PDUs that are constructed by 5G stack 515 based on traffic received from UE 205 via the 5G RAT. For instance, each PDCP PDU, generated by 5G stack 515, may be associated only with traffic that is associated with one QCI. In some implementations, each PDCP PDU may be associated with traffic that is associated with more than one QCI. As mentioned above, in such implementations, the PDCP PDU may be marked with a QoS marking that is based on one of the QCIs with which traffic, included in the PDCP PDU, is associated (e.g., the highest level of QoS, which corresponds to lower QCI numbers).

5G stack 515 may construct GTP PDUs based on the PDCP PDUs. As with the PDCP PDUs, each GTP PDU may correspond to one QoS level, or may include traffic that corresponds to multiple QoS levels. 5G stack 515 may output (at 635) the GTP PDUs to VGW 315. VGW 315 may proceed to route the traffic toward their intended destination (e.g., to PDN 240 and/or some other network or device).

In the uplink direction (i.e., for traffic intended for UE 205), VGW 315 may output (at 640) GTP PDUs to V-eNB 215 505 (e.g., to 5G stack 515). Each GTP PDU may be associated with a particular QoS level (e.g., may include traffic that is associated with only one QCI). In some implementations, a particular GTP PDU may include traffic that is associate with multiple QoS levels, and may include a QoS marking that indicates one of the multiple QoS levels (e.g., a highest QoS level, of the multiple QoS levels). 5G stack 515 may decapsulate (at 645) the GTP PDUs, which may yield PDCP PDUs. As similarly discussed above, the PDCP PDUs may each be associated with one particular QoS level (e.g., may include traffic that is associated with one QCI). 5G stack 515 may determine the QoS level, of each PDCP PDU (and/or of GTP PDUs that include the PDCP PDUs), by inspecting a header of the PDU (e.g., by inspecting a PDCP header of a PDCP PDU or by inspecting a GTP header of a GTP PDU). Additionally, or alternatively, 5G stack 515 may determine the QoS level by inspecting lower layers of the PDCP PDUs (e.g., by performing deep packet inspection), or by determining the QoS level after decapsulating the PDCP PDUs to yield RLC PDUs. That is, 5G stack 515 may decapsulate the PDCP PDUs to yield RLC PDUs, and then may determine the QoS level by inspecting RLC headers of the RLC PDUs.

5G stack 515 may, in some implementations, maintain a mapping of QoS levels to the appropriate RAT. For example, the 5G RAT may be associated with one set of QCIs, while the 4G RAT may be associated with another set of QCIs. 5G stack 515 may use this mapping to determine which RLC PDUs should be processed according to which RAT. For instance, after determining the QoS levels associated with the RLC PDUs, 5G stack 515 may output (at 650) certain RLC PDUs (i.e., the RLC PDUs that have a QoS level that, according to the mapping, is associated with the 4G RAT) to 4G stack 510, and may process the other RLC PDUs (i.e., the RLC PDUs that have a QoS level that is associated with the 5G RAT).

4G stack 510 may process the RLC PDUs (received at 650) by decapsulating the RLC PDUs to yield MAC PDUs, and may output (at 655) the MAC PDUs toward UE 205 (e.g., by outputting the MAC PDUs to 4G RE/RC 210). 4G RE/RC 210 may decapsulate the MAC PDUs, and provide the traffic associated with the MAC PDUs to UE 205 as PHY traffic, via the 4G RAT.

Similarly, 5G stack 515 may process the RLC PDUs (decapsulated at 645) by decapsulating the RLC PDUs to yield MAC PDUs, and may output (at 660) the MAC PDUs toward UE 205 (e.g., by outputting the MAC PDUs to 5G RE/RC 212). 5G RE/RC 212 may decapsulate the MAC PDUs, and provide the traffic associated with the MAC PDUs to UE 205 as PHY traffic, via the 5G RAT.

Figure 7:
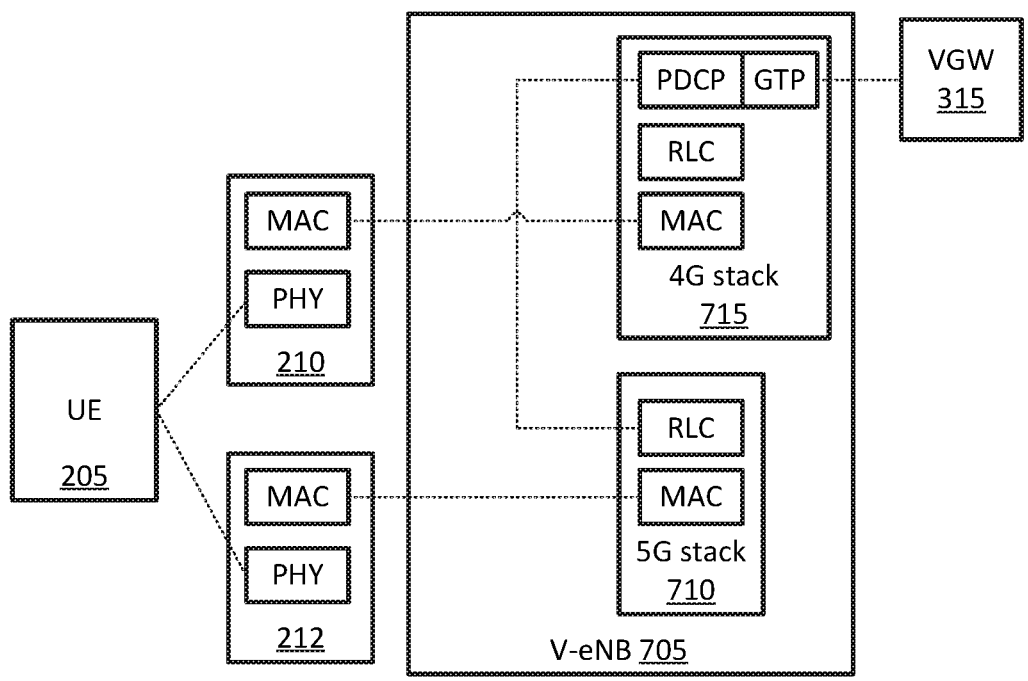
FIG. 7 illustrates example functional components of various devices, including a V-eNB 215, in accordance with one or more implementations where a 4G RAT is a "master" RAT.
Figure 8:
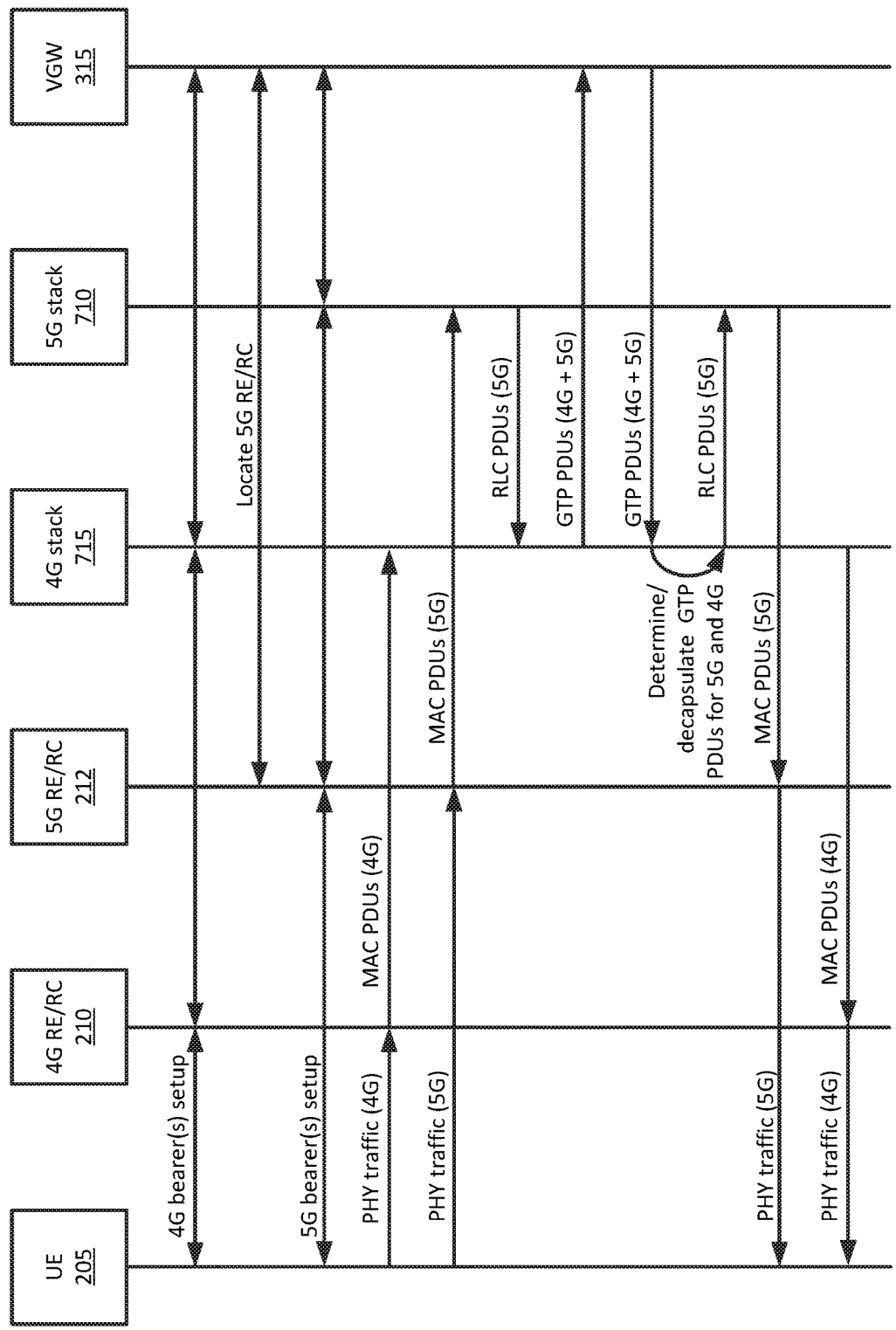
FIG. 8 illustrates example signaling that may occur, in accordance with one or more implementations where a 4G RAT is a "master" RAT.

FIG. 7 illustrates example components of V-eNB 215 705, in an implementation in which the 4G RAT is the "master" RAT. In contrast with the example shown in FIG. 5, 5G stack 710 may process MAC PDUs up to the RLC layer, and provide RLC PDUs to 4G stack 715 for processing.

An example signal flow, which relates to the components shown in FIG. 7, is shown in FIG. 8. The signals shown in this figure are similar to those shown in FIG. 6, with the exception of the 4G RAT being the "master" RAT in this example. Thus, as shown, instead of 5G stack 515 constructing PDCP and GTP PDUs (in the uplink direction) and decapsualting GTP and PDCP PDUs (in the downlink direction), 4G stack 715 may perform these operations in the example of FIG. 8.

Figure 9:
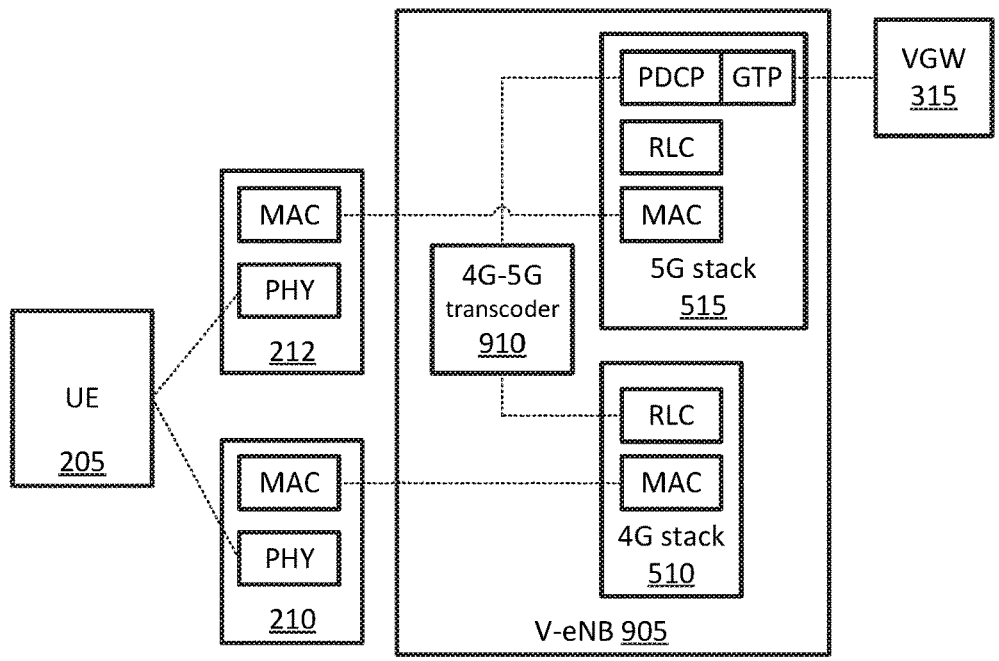
FIGS. 9 and 10 illustrate example functional components of various devices, including a V-eNB 215, in accordance with one or more implementations in which a transcoder is used between 4G and 5G protocol stacks.
Figure 10:
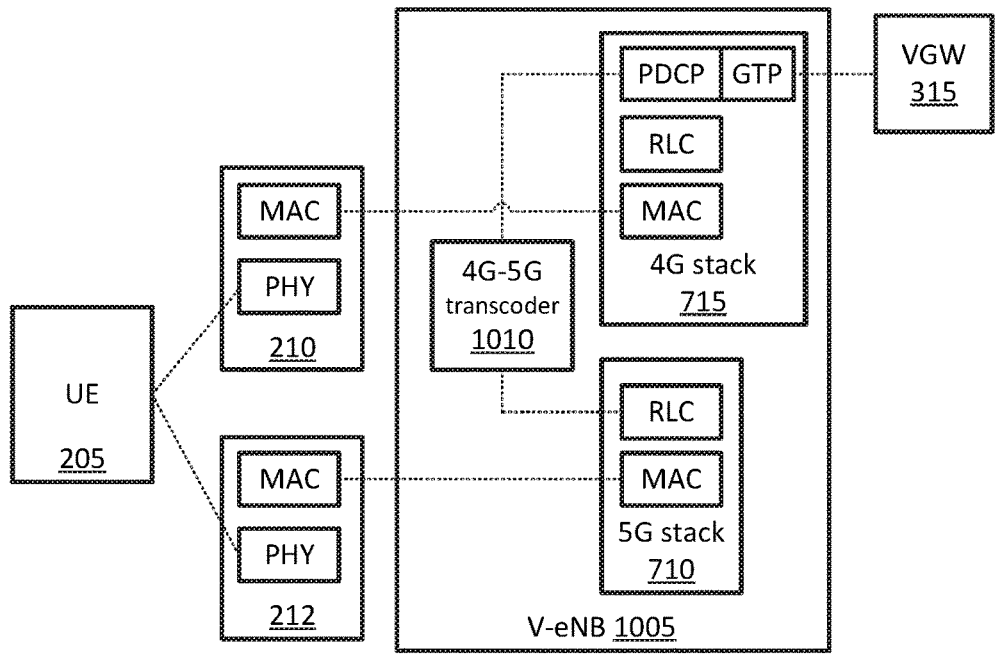

FIGS. 9 and 10 illustrate alternate implementations of FIGS. 5 and 7, respectively. The example components shown in FIGS. 9 and 10 may be useful in implementations where PDUs of the 4G and 5G protocol stacks are not interoperable (e.g., where 5G stack 515 is not able to encapsulate or decapsulate PDUs destined for or received from 4G stack 510, or where 4G stack 715 is not able to encapsulate or decapsulate PDUs destined for or received from 5G stack 710).

In FIG. 9, V-eNB 215 905 may include the components of V-eNB 215 505, with the addition of 4G-5G transcoder 910. 4G-5G transcoder 910 may transcode RLC PDUs, received from 4G stack 510, into a format that is decipherable by 5G stack 515 (e.g., may transcode RLC PDUs, according to 4G standards, into RLC and/or PDCP PDUs according to 5G standards). V-eNB 215 905 may also transcode PDCP and/or RLC PDUs, received from 5G stack 515, into a format that is decipherable by 4G stack 510 (e.g., may transcode PDCP and/or RLC PDUs, according to 5G standards, into RLC and/or PDCP PDUs according to 4G standards).

In FIG. 10, V-eNB 215 1005 may include the components of V-eNB 215 705, with the addition of 4G-5G transcoder 1010. 4G-5G transcoder 1010 may transcode RLC PDUs, received from 5G stack 710, into a format that is decipherable by 4G stack 715 (e.g., may transcode RLC PDUs, according to 5G standards, into RLC and/or PDCP PDUs according to 4G standards). V-eNB 215 1005 may also transcode PDCP and/or RLC PDUs, received from 4G stack 715, into a format that is decipherable by 5G stack 710 (e.g., may transcode PDCP and/or RLC PDUs, according to 4G standards, into RLC and/or PDCP PDUs according to 5G standards).

Figure 11:
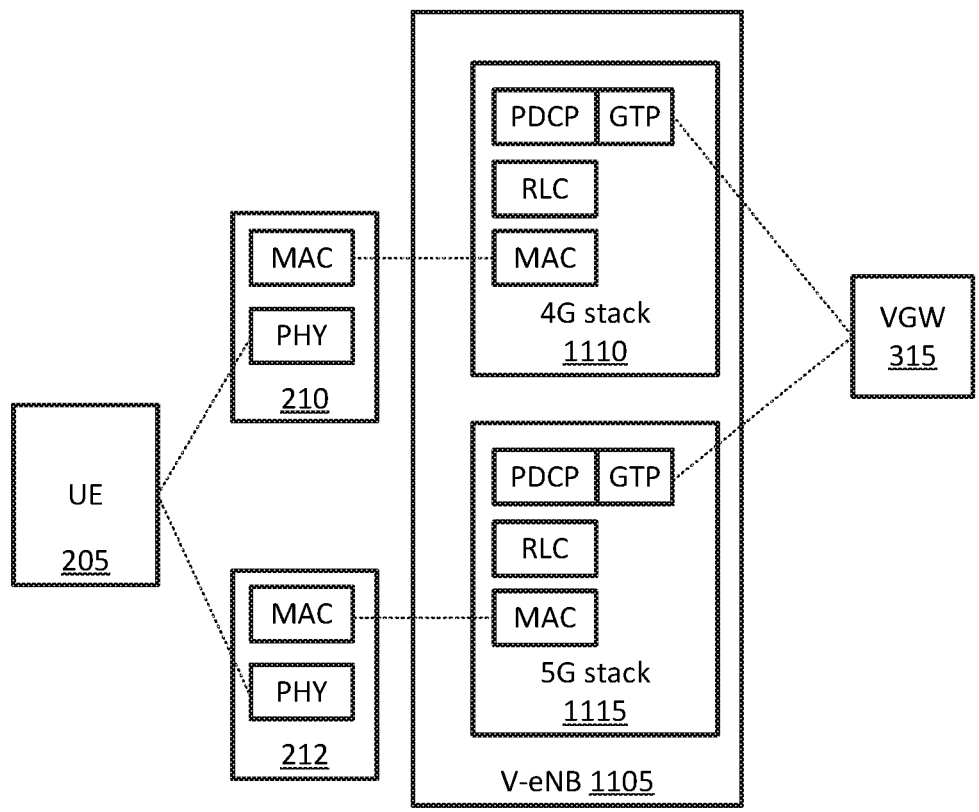
FIG. 11 illustrates example functional components of various devices, including a V-eNB 215, in accordance with one or more implementations where 4G and 5G traffic flows operate independently.
Figure 12:
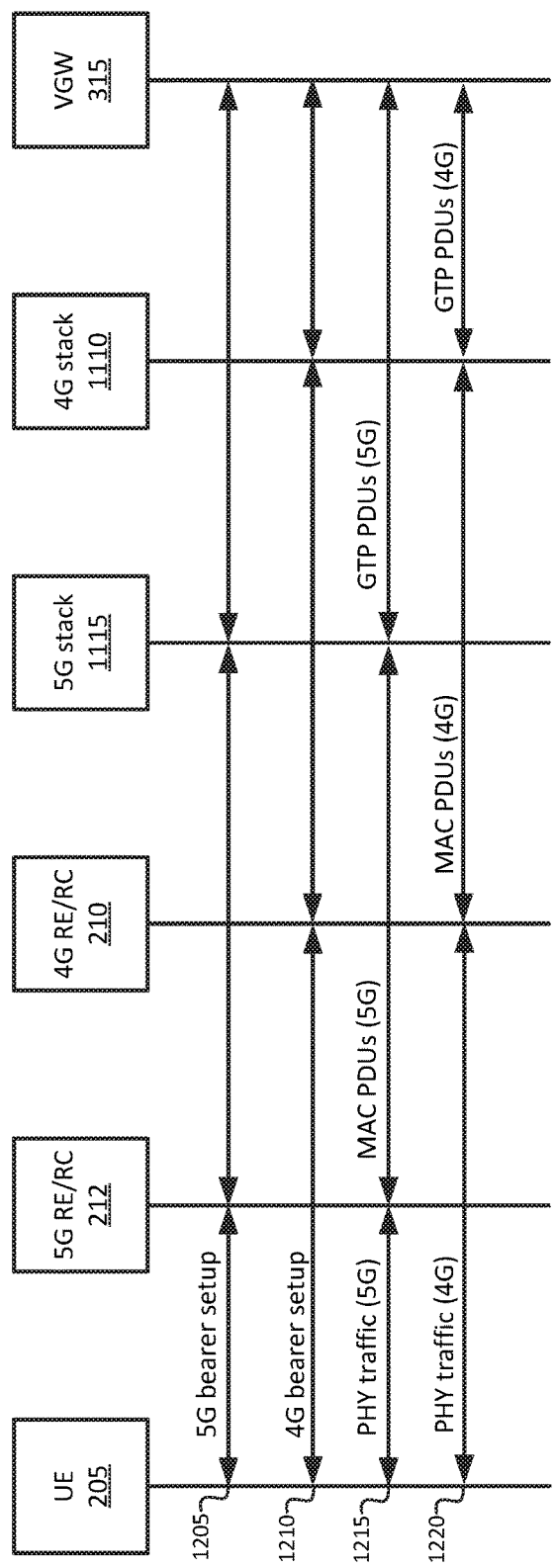
FIG. 12 illustrates example signaling that may occur, in accordance with one or more implementations where 4G and 5G traffic flows operate independently.

FIG. 11 illustrates example components of V-eNB 215 1105, in accordance with some implementations. In the example shown in FIG. 11, 4G stack 1110 and 5G stack 1115 may process traffic separately (i.e., without interacting with each other). Thus, in this example, 4G stack 1110 and 5G stack 1115 may each have distinct GTP tunnels established to VGW 315 (i.e., 4G stack 1110 may have established a first GTP tunnel to VGW 315, while 5G stack 1115 has established a second GTP tunnel to VGW 315).

In some implementations, UE 205 may simultaneously connect to both 4G and 5G RATs (e.g., to 4G RE/RC 210 and 5G RE/RC 212), and may send and/or receive traffic simultaneously to and/or from both 4G RE/RC 210 and 5G RE/RC 212. In some implementations, traffic for the same application may be sent over both RATs. For instance, in the uplink direction, UE 205 may send a portion of the traffic for a particular application via 4G RE/RC 210, and may send another portion of the traffic for the same application via 5G RE/RC 212. Similarly, in the downlink direction, traffic for a particular application may be sent to UE 205 via both 4G RE/RC 210 and 5G RE/RC 212. For instance, VGW 315 may split the traffic for a particular application into two portions, and may send a first portion of the traffic via 4G RE/RC 210 (e.g., via 4G stack 1110), and may send another portion of the traffic for the same application to UE 205 via 5G RE/RC 212 (e.g., via 5G stack 1115). The multiple portions of the traffic may be processed and re-sequenced at UE 205 before being processed by the application layer of UE 205. In some implementations, the different portions of the traffic may be sent via respective "Best Effort" bearers (i.e., a "Best Effort" bearer on the 4G RAT, and another "Best Effort" bearer on the 5G RAT).

FIG. 12 illustrates example signals that may occur with respect to the components shown in FIG. 12. As shown, one or more 5G bearers may be set up (at 1205) for the UE. The 5G bearer setup process may include establishing bearers and/or other communication pathways between UE 205 and 5G RE/RC 212, between 5G RE/RC 212 and 5G stack 1115, and 5G stack 1115 and VGW 315 (e.g., one or more GTP tunnels between 5G stack 1115 and VGW 315). Additionally, one or more 4G bearers may be set up (at 1210) for the UE. The 4G bearer setup process may include establishing bearers and/or other communication pathways between UE 205 and 4G RE/RC 210, between 4G RE/RC 210 and 4G stack 1110, and 4G stack 1110 and VGW 315 (e.g., one or more GTP tunnels between 4G stack 1110 and VGW 315).

As further shown, traffic flows may be communicated (at 1215) via the 5G RAT between UE 205 and (ultimately) VGW 315. For example, UE 205 may send and/or receive PHY traffic to and/or from 5G RE/RC 212 using the 5G RAT, 5G RE/RC 212 may encapsulate (in the uplink direction) and/or decapsulate (in the downlink direction) MAC PDUs as discussed above, and 5G stack 1115 may encapsulate and/or decapsulate GTP PDUs as discussed above. Similarly, UE 205 may send and/or receive PHY traffic to and/or from 4G RE/RC 210 using the 4G RAT, 4G RE/RC 210 may encapsulate (in the uplink direction) and/or decapsulate (in the downlink direction) MAC PDUs as discussed above, and 4G stack 1110 may encapsulate and/or decapsulate GTP PDUs as discussed above.

Figure 13:
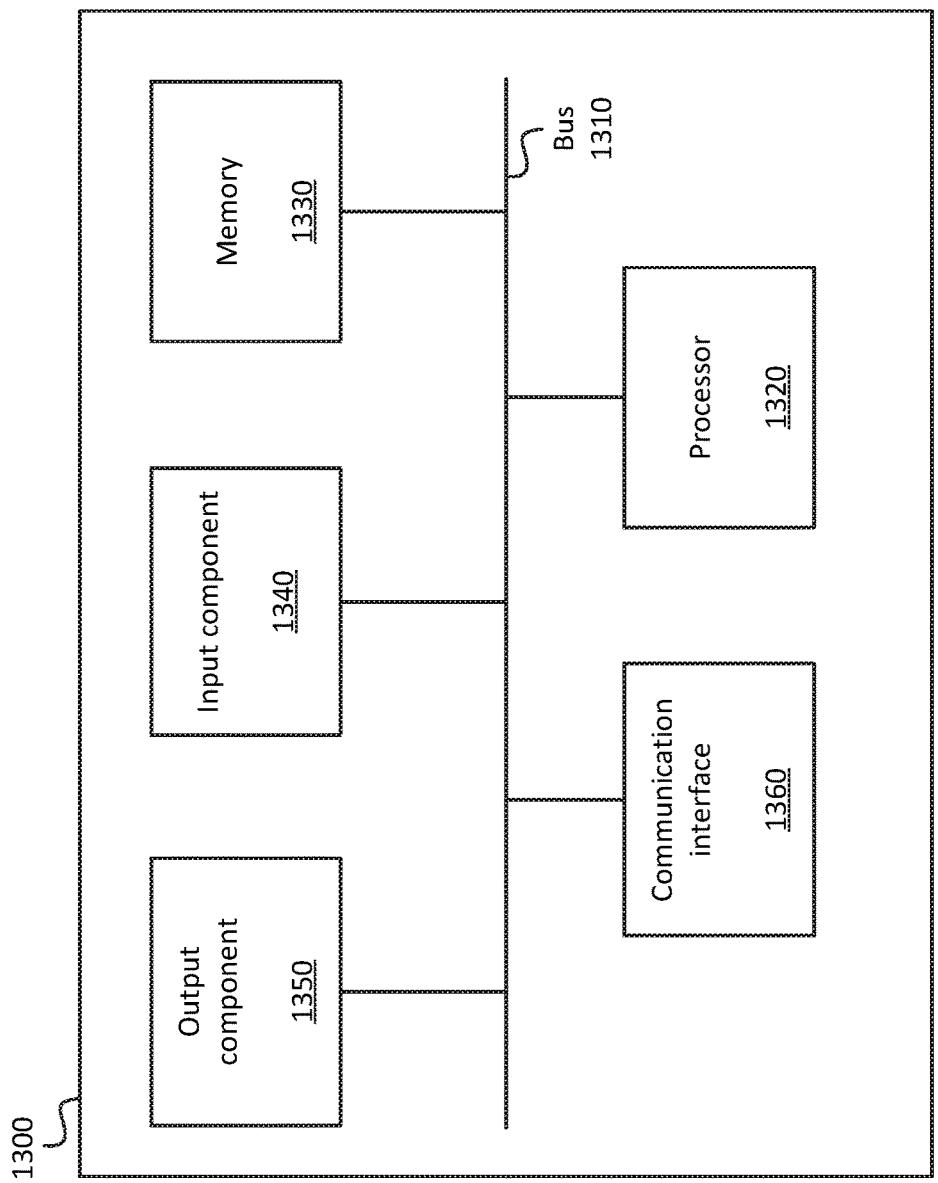
FIG. 13 illustrates example components of a device, in accordance with some implementations described herein.

FIG. 13 is a diagram of example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For instance, while some examples were described above in the context of a VGW 315, similar concepts may be practiced with a conventional SGW 220 and/or MME 222 (albeit without the benefits of a VGW, which can include scalability and more efficient use of resources, thus resulting in reduced costs). Additionally, while concepts were described above in the context of 4G and 5G RATs, similar concepts can be used with other types of RATs. For instance, the term "5G," as used herein, may more broadly refer to "next generation" standards (e.g., standards that have been introduced after the 4G standard). Thus, in figures and descriptions that include the term "5G," other terms that describe other standards and/or protocols may be substituted without departing from the spirit of the invention.

As another example, while series of signals have been described with regard to FIGS. 6, 8, and 12, the order of the signals may be modified in other implementations. Further, non-dependent signals may be performed in parallel. Additionally, while FIGS. 6, 8, and 12 have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms) as used herein to describe a relationship of a value to a threshold, may be used interchangeably with the term "greater than or equal to" (or similar terms), Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   first radio equipment implementing a first radio access network ("RAN") according to a first radio access technology ("RAT");
   second radio equipment implementing a second RAN according to a second RAT that is different from the first RAT; and
   a virtualized base station,
   wherein the first radio equipment is configured to:
      receive traffic from a user equipment ("UE") via a first air interface according to the first RAT; and
      provide the traffic, received via the first air interface, via first media access control ("MAC") protocol data units ("PDUs") to the virtualized base station;
   wherein the second radio equipment is configured to:
      receive traffic from the UE via a second air interface according to the second RAT; and
      provide the traffic, via second MAC PDUs to the virtualized base station;
   wherein the virtualized base station is configured to:
      generate General Packet Radio ("GPRS") Tunneling Protocol ("GTP") PDUs based on the first MAC PDUs and the second MAC PDUs; and
      forward the generated GTP PDUs to a core network of a wireless telecommunications network.

2. The system of claim 1, wherein the core network of the wireless telecommunications network includes an Evolved Packet Core ("EPC").

3. The system of claim 1, wherein the traffic is first traffic associated with a first application,
   wherein the first radio equipment is further configured to:
      receive second traffic from the UE via the first air interface, the second traffic being associated with a second application; and
      provide the second traffic to the virtualized base station;
   wherein the second radio equipment is further configured to:
      receive third traffic from the UE via the second air interface, the third traffic being associated with the second application; and
      provide the third traffic to the virtualized base station; and
   wherein the virtualized base station is further configured to:
      provide the second traffic to the core network via a first GTP tunnel; and
      provide the third traffic to the core network via a second GTP tunnel.

4. The system of claim 1, wherein the virtualized base station processes the first and second MAC PDUs in lieu of an evolved Node B.

5. The system of claim 1, wherein the virtualized base station includes distinct first and second protocol stacks that are associated with the first and second RATs, respectively.

6. The system of claim 5,
   wherein the first protocol stack is configured to:
      generate first radio link control ("RLC") PDUs based on the first MAC PDUs;
      generate first Packet Data Convergence Protocol ("PDCP") PDUs based on the first RLC PDUs; and
      generate first GTP PDUs based on the first PDCP PDUs;
   wherein the second protocol stack is configured to:
      generate second radio link control ("RLC") PDUs based on the second MAC PDUs; and
      output the second RLC PDUs to the first protocol stack;
   wherein the first protocol stack is further configured to:
      receive the second RLC PDUs from the first protocol stack;
      generate second PDCP PDUs based on the received second RLC PDUs; and
      generate second GTP PDUs based on the second PDCP PDUs,
   wherein forwarding the generated GTP PDUs to the core network includes forwarding the generated first and second GTP PDUs to the core network.

7. The system of claim 6, wherein the first GTP PDUs are associated with a first quality of service class identifier ("QCI"), and wherein the second GTP PDUs are associated with a second QCI that is different from the first QCI.

8. The system of claim 1, wherein the virtualized base station is further configured to:
   establish first and second GTP tunnels with the core network; and
   when forwarding the generated GTP PDUs to the core network:
      forward first GTP PDUs, that are based on traffic received from the UE via the first air interface, via the first GTP tunnel; and
      forward second GTP PDUs, that are based on traffic received from the UE via the second air interface, via the second GTP tunnel.

9. The system of claim 1,
   wherein the virtual base station is further configured to:
      receive GTP PDUs, destined for the UE, from the core network;
      identify a quality of service class indicator ("QCI") associated with each GTP PDU;
      process GTP PDUs, that have been identified as being associated with a first QCI, via a first protocol stack that is associated with the first RAT; and
      process GTP PDUs, that have been identified as being associated with a second QCI, via a second protocol stack that is associated with the second RAT.

10. A method, comprising:
   receiving, by first radio equipment, traffic from a user equipment ("UE") via a first air interface according to a first radio access technology ("RAT");
   providing, by the first radio equipment, the traffic received via the first air interface, via first media access control ("MAC") protocol data units ("PDUs") to a virtualized base station;
   receiving, by second radio equipment, traffic from the UE via a second air interface according to a second RAT that is different from the first RAT;
   providing, by the second radio equipment, the traffic received via the second air interface, via second MAC PDUs, to the virtualized base station;
   generating, by the virtualized base station, General Packet Radio ("GPRS") Tunneling Protocol ("GTP") PDUs based on the first MAC PDUs and the second MAC PDUs; and
   forwarding, by the virtualized base station, the generated GTP PDUs to a core network of a wireless telecommunications network.

11. The method of claim 10, wherein the virtualized base station processes the first and second MAC PDUs in lieu of an evolved Node B.

12. The method of claim 10, wherein the virtualized base station includes distinct first and second protocol stacks that are associated with the first and second RATs, respectively.

13. The method of claim 12, further comprising:
generating, by the first protocol stack, first radio link control ("RLC") PDUs based on the first MAC PDUs;
generating, by the first protocol stack, first Packet Data Convergence Protocol ("PDCP") PDUs based on the first RLC PDUs;
generating, by the first protocol stack, first GTP PDUs based on the first PDCP PDUs;
generating, by the second protocol stack, second radio link control ("RLC") PDUs based on the second MAC PDUs;
outputting, by the second protocol stack, the second RLC PDUs to the first protocol stack;
generating, by the first protocol stack, second PDCP PDUs based on the received second RLC PDUs; and
generating, by the first protocol stack, second GTP PDUs based on the second PDCP PDUs,
wherein forwarding the generated GTP PDUs to the core network includes forwarding the generated first and second GTP PDUs to the core network.

14. The method of claim 13, wherein the first GTP PDUs are associated with a first quality of service class identifier ("QCI"), and wherein the second GTP PDUs are associated with a second QCI that is different from the first QCI.

15. The method of claim 10, further comprising:
establishing, by the virtualized base station, first and second GTP tunnels with the core network; and
when forwarding the generated GTP PDUs to the core network:
forwarding first GTP PDUs, that are based on traffic received from the UE via the first air interface, via the first GTP tunnel; and
forwarding second GTP PDUs, that are based on traffic received from the UE via the second air interface, via the second GTP tunnel.

16. The method of claim 10, further comprising:
receiving, by the virtualized base station and from the core network, GTP PDUs that are destined for the UE;
identifying, by the virtualized base station, a quality of service class indicator ("QCI") associated with each GTP PDU;
processing GTP PDUs, that have been identified as being associated with a first QCI, via a first protocol stack that is associated with the first RAT; and
processing GTP PDUs, that have been identified as being associated with a second QCI, via a second protocol stack that is associated with the second RAT.

17. A non-transitory computer-readable medium, storing processor-executable instructions, which, when executed by one or more processors, cause the one or more processors to:
receive traffic from a user equipment ("UE") via a first air interface according to a first radio access technology ("RAT");
provide the traffic received via the first air interface, via first media access control ("MAC") protocol data units ("PDUs") to a virtualized base station;
receive traffic from the UE via a second air interface according to a second RAT that is different from the first RAT;
provide the traffic received via the second air interface, via second MAC PDUs, to the virtualized base station;
generate, by the virtualized base station, General Packet Radio ("GPRS") Tunneling Protocol ("GTP") PDUs based on the first MAC PDUs and the second MAC PDUs; and
forward the generated GTP PDUs to a core network of a wireless telecommunications network.

18. The non-transitory computer-readable medium of claim 17, wherein the virtualized base station processes the first and second MAC PDUs in lieu of an evolved Node B.

19. The non-transitory computer-readable medium of claim 17, wherein the virtualized base station includes distinct first and second protocol stacks that are associated with the first and second RATs, respectively.

20. The non-transitory computer-readable medium of claim 19, wherein executing the processor-executable instructions further causes the one or more processors to:
generate, by the first protocol stack, first radio link control ("RLC") PDUs based on the first MAC PDUs;
generate, by the first protocol stack, first Packet Data Convergence Protocol ("PDCP") PDUs based on the first RLC PDUs;
generate, by the first protocol stack, first GTP PDUs based on the first PDCP PDUs;
generate, by the second protocol stack, second radio link control ("RLC") PDUs based on the second MAC PDUs;
output, by the second protocol stack, the second RLC PDUs to the first protocol stack;
generate, by the first protocol stack, second PDCP PDUs based on the received second RLC PDUs; and
generate, by the first protocol stack, second GTP PDUs based on the second PDCP PDUs,
wherein forwarding the generated GTP PDUs to the core network includes forwarding the generated first and second GTP PDUs to the core network.

* * * * *